US006829131B1

(12) United States Patent
Loeb et al.

(10) Patent No.: US 6,829,131 B1
(45) Date of Patent: Dec. 7, 2004

(54) MEMS DIGITAL-TO-ACOUSTIC TRANSDUCER WITH ERROR CANCELLATION

(75) Inventors: Wayne A. Loeb, Pittsburgh, PA (US); John J. Neumann, Jr., Pittsburgh, PA (US); Kaigham J. Gabriel, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/395,073

(22) Filed: Sep. 13, 1999

(51) Int. Cl.[7] ................................................ H02H 23/00
(52) U.S. Cl. ........................ 361/234; 361/115; 361/233
(58) Field of Search ........................... 361/115, 90, 234, 361/58, 160, 233

(56) References Cited

U.S. PATENT DOCUMENTS

| | | | | |
|---|---|---|---|---|
| 4,555,797 A | | 11/1985 | Nieuwendijk et al. | 381/117 |
| 5,658,710 A | | 8/1997 | Neukermans | |
| 5,717,631 A | | 2/1998 | Carley et al. | 365/174 |
| 5,774,252 A | | 6/1998 | Lin et al. | 359/224 |
| 5,808,781 A | | 9/1998 | Arney et al. | 359/291 |
| 5,867,302 A | | 2/1999 | Fleming | 359/291 |
| 5,876,187 A | | 3/1999 | Afromowitz et al. | 417/322 |
| 5,949,892 A | * | 9/1999 | Stewart | 381/113 |
| 5,970,315 A | | 10/1999 | Carley et al. | 438/52 |
| 6,028,331 A | | 2/2000 | Mastromatteo et al. | 257/253 |
| 6,128,961 A | | 10/2000 | Haronian | 73/774 |
| 6,262,946 B1 | * | 7/2001 | Khuri-Yakub et al. | 367/181 |

FOREIGN PATENT DOCUMENTS

| | | |
|---|---|---|
| EP | 0 911 952 A2 | 4/1999 |
| WO | WO 93/19343 A1 | 9/1993 |
| WO | WO 94/30030 A1 | 12/1994 |

OTHER PUBLICATIONS

Peter Clarke, "English startup claims breakthrough in digital loudspeakers", EETimes online, posted at http://www.eetimes.com/news/98/1017 news/english.html on Jul. 13, 1998, pp. 1–5.

Jon Iverson, "New Digital Loudspeaker Technology Announced from England", Stereophile News, posted at http://www.stereophile.com/shownews.cgi?234 on Aug. 10, 1998, pp. 1–2.

Jon Iverson, "Just What Is a Digital Loudspeaker?", Stereophile News, posted at http://www.stereophile.com/shownews.cgi?235 on Aug. 10, 1998, pp. 1–3.

* cited by examiner

*Primary Examiner*—Stephen W. Jackson
(74) *Attorney, Agent, or Firm*—Thorp Reed & Armstrong, LLP

(57) ABSTRACT

An acoustic transducer comprising a substrate; and a diaphragm formed by depositing a micromachined membrane onto the substrate. The diaphragm is formed as a single silicon chip using a CMOS MEMS (microelectromechanical systems) semiconductor fabrication process. The curling of the diaphragm during fabrication is reduced by depositing the micromachined membrane for the diaphragm in a serpentine-spring configuration with alternating longer and shorter arms. As a microspeaker, the acoustic transducer of the present invention converts a digital audio input signal directly into a sound wave, resulting in a very high quality sound reproduction at a lower cost of production in comparison to conventional acoustic transducers. The micromachined diaphragm may also be used in microphone applications.

29 Claims, 6 Drawing Sheets

MEMS DIGITAL-TO-ACOUSTIC TRANSDUCER WITH ERROR CANCELLATION

I. CROSS REFERENCE TO RELATED APPLICATIONS (Not Applicable)

II. STATEMENT REGARDING FEDERALLY SPONSORED RESEARCH OR DEVELOPMENT (Not Applicable)

III. BACKGROUND OF THE INVENTION

1. Field of the Invention

The present invention broadly relates to acoustic transducers and, more particularly, to a digital audio transducer constructed using microelectromechanical systems (MEMS) technology.

2. Description of the Related Art

Electroacoustic transducers convert sound waves into electrical signals and vice versa. Some commonly known electroacoustic or audio transducers include microphones and loudspeakers, which find numerous applications in all facets of modern electronic communication. For example, a telephone handset includes both, a microphone and a speaker, to enable the user to talk and listen to the calling party. A typical microphone is an electromechanical transducer that converts changes in the air pressure in its vicinity into corresponding changes in an electrical signal at its output. A typical loudspeaker is an electromechanical transducer that converts electrical audio signals at its input into sound waves generated at its output due to changes in the air pressure in the vicinity of the loudspeaker.

Typical relevant art electroacoustic transducers are manufactured serially. In other words, the speakers and microphones are manufactured from different and discrete components involving many assembly steps. For example, the construction of a carbon microphone may require a number of discrete components such as a movable metal diaphragm, carbon granules, a metal case, a base structure, and a dust cover (on the diaphragm). A cone-type moving-coil loudspeaker may require an inductive voice coil, a permanent magnet, a metal and a paper cone assembly, etc. Thus, there is little cost benefit in manufacturing such audio transducers in high volume quantities. In addition, the performance of relevant art electroacoustic transducers is limited by the fluctuations in the performance of the discrete constituent components due to, for example, changes in the ambient temperature, as well as by variations in the assembly process. Variations in the materials and workmanship of discrete constituent components may also affect the performance of the resulting audio transducer.

U.S. Pat. No. 4,555,797 discloses a hybrid loudspeaker system that receives a digital audio signal as an input (as opposed to an analog audio signal typically input to a conventional loudspeaker) and directly generates audible sound therefrom via a voice coil that is subdivided into parts that are connected in series. The voice coil parts are then selectively shorted according to the value of the corresponding bits in the digital audio input word. However, the voice coil may be required to be precisely subdivided for each loudspeaker manufactured. Furthermore, each part of the divided voice coil may need to be precisely positioned as part of the mechanical loudspeaker structure to give an impulse that is accurate to the order of the least significant bit in the digital audio input. The discrete nature of the voice coil exposes it to the consistency, cost and quality problems associated in production and performance of typical loudspeakers as noted above. The voice coils may have to be produced serially with identically manufactured elements so as to assure consistency in performance. Hence, commercial production of instruments incorporating divided voice coils may not be lucrative in view of the complexities involved and the accuracies required as part of coil production and use.

Additionally, solid-state piezoelectric films have been used as ultrasonic transducers. However, ultrasonic frequencies are not audible to a human ear. The air movement near an ultrasonic transducer may not be large enough to generate audible sound.

Accordingly, there exists a need in the relevant art for an electroacoustic transducer which is less expensive to produce and which is smaller in size. It is desirable to construct a solid-state electroacoustic transducer without relying on discrete components, thereby making the performance of the audio transducer uniform and less dependent on external parameters such as, for example, ambient temperature fluctuations. There also exists a need for an acoustic transducer that directly converts a digital audio input into an audible sound wave, thereby facilitating lighter earphones. Furthermore, it is desirable to construct an electroacoustic transducer that allows for the integration of other audio processing circuitry therewith.

IV. SUMMARY OF THE INVENTION

The present invention contemplates an acoustic transducer that includes a substrate, and a diaphragm formed by depositing a micromachined membrane onto the substrate, wherein the diaphragm is configured to generate an audio frequency acoustic wave when actuated with an electrical audio input.

The present invention further contemplates a method of constructing an acoustic transducer. The method includes forming a substrate, and forming a diaphragm on the substrate by depositing at least one layer of a micromachined membrane onto the substrate, wherein the diaphragm is configured to generate an audio frequency acoustic wave when actuated with an electrical audio input.

The present invention represents a substantial advance over relevant art electroacoustic transducers. The present invention has the advantage that it can be manufactured at a lower cost of production in comparison to relevant art acoustic transducers. The acoustic transducer according to the present invention converts a digital audio input signal directly into a sound wave. The present invention also has the advantage that the size of the acoustic transducer can be significantly reduced in comparison to relevant art audio transducers by integrating the electroacoustic transducer onto a substrate using microelectromechanical systems (MEMS) technology. Additional audio circuitry including a digital signal processor, a sense amplifier, an analog-to-digital converter and a pulse width modulator may also be integrated with the acoustic transducer on a single silicon chip, resulting in very high quality audio reproduction. The non-linearity and distortion in frequency response are corrected with on-chip negative feedback, allowing substantial improvement in sound quality. The acoustic transducer of the present invention is capable of on-the-fly compensation for changing acoustical impedances, thereby ensuring a substantially flat frequency response over a wide range of acoustical loads.

BRIEF DESCRIPTION OF THE DRAWINGS

Further advantages of the present invention may be better understood by referring to the following description taken in conjunction with the accompanying drawings, in which.

VI. DETAILED DESCRIPTION OF PREFERRED EMBODIMENTS

Figure 1:
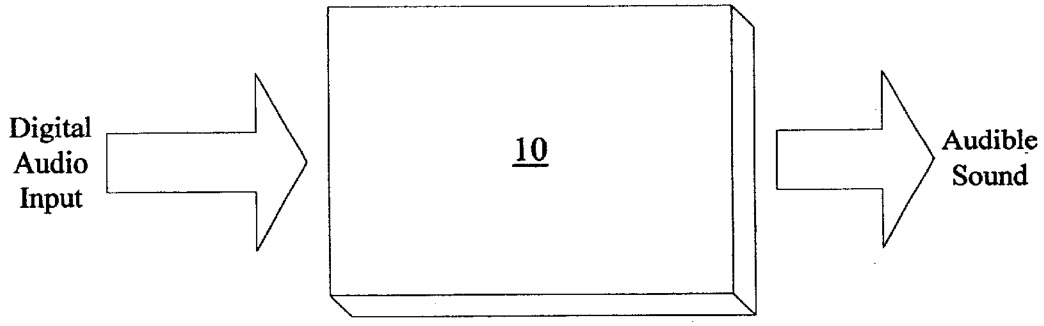
FIG. 1 shows a housing encapsulating circuit elements of an acoustic transducer according to the present invention.

Referring now to FIG. 1, a housing 10 encapsulating circuit elements of an acoustic transducer according to the present invention is shown. In the embodiment of FIG. 1, the acoustic transducer included within the housing 10 is a microspeaker unit that converts the received digital audio input into audible sound. As discussed later, the microspeaker in the housing 10 generates audible sound directly from the digital audio input, which may be from any audio source, e.g., a compact disc player. In one embodiment, the microspeaker in the housing 10 is configured to receive analog audio input (instead of the digital input shown in FIG. 1) and to generate the audible sound from that analog input. In an alternative embodiment (not shown in FIG. 1), the housing 10 may encapsulate a microphone unit that receives sound waves and converts them into electrical signals. The output from the housing 10 in that case may be in analog or digital form as desired by the circuit designer.

Figure 2:
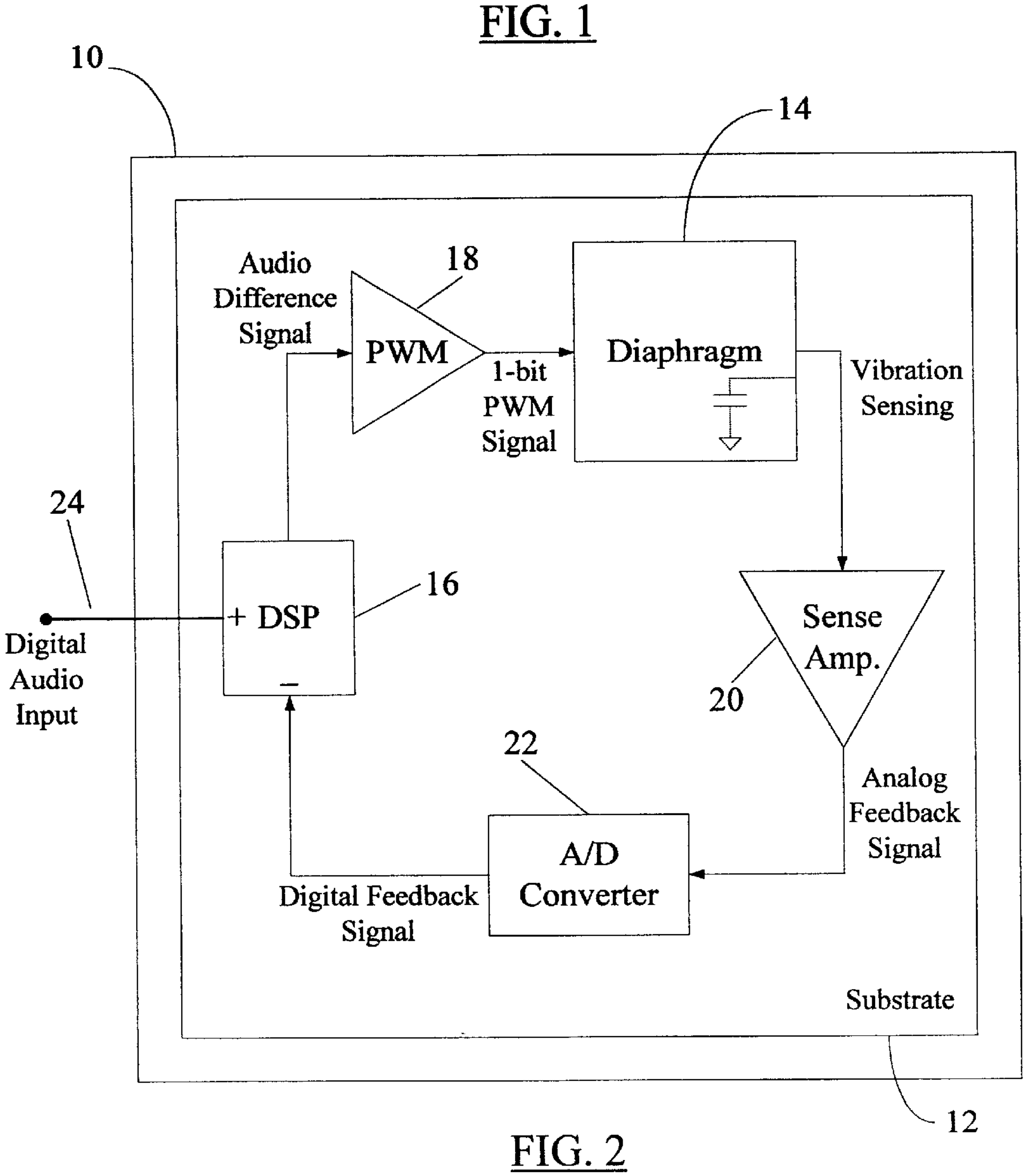
FIG. 2 illustrates an embodiment of various circuit elements encapsulated within the housing in FIG. 1.

Turning now to FIG. 2, an embodiment of various circuit elements encapsulated within the housing 10 in FIG. 1 is illustrated. The acoustic transducer shown in FIG. 2 is a microspeaker unit that includes a diaphragm 14 formed by depositing a micromachined membrane onto a substrate 12. The substrate 12 may typically be a die of a larger substrate such as, for example, the substrate used in a batch fabrication as discussed later. In the discussion below, the same numeral '10' is associated with the terms "housing", "microspeaker unit" or "microspeaker" for the sake of simplicity because of the integrated nature of the acoustic transducer unit illustrated in FIG. 2. In other words, "housing" 10 in FIG. 2 may refer to a single physical encapsulation including a "microspeaker unit" (or a "microspeaker") that is formed of an audio processing circuitry and the diaphragm 14 fabricated onto the substrate 12 as discussed below, and vice versa, i.e., "microspeaker unit" 10 (or "microspeaker" 10) may refer to a physical structure that includes an integrated circuit unit (comprising the substrate 12, the micromachined diaphragm 14, and additional audio processing circuitry) and the housing encapsulating that integrated circuit unit. Furthermore, in certain contexts, the term "housing" may just refer to the external physical structure of the microspeaker unit, without referring to the micromachined diaphragm 14 and other integrated circuits encapsulated within that external physical structure.

The diaphragm 14 is constructed on the substrate 12 using microelectromechanical systems (MEMS) technology. In the embodiment shown in FIG. 2, the micromachined membrane for the diaphragm 14 is a CMOS (Complementary Metal Oxide Semiconductor) MEMS membrane. A CMOS MEMS fabrication technology—a brief general description of which is given below—is used to fabricate the diaphragm 14. The CMOS MEMS fabrication process is well known in the art and is described in a number of prior art documents. In one embodiment, the diaphragm 14 is fabricated using the CMOS MEMS technology described in U.S. Pat. No. 5,717,631 (issued on Feb. 10, 1998) and in U.S. patent application Ser. No. 08/943,663 (filed on Oct. 3, 1997 and allowed on May 20, 1999)—the contents of both of these documents are herein incorporated by reference in their entireties.

Micromachining commonly refers to the use of semiconductor processing techniques to fabricate devices known as microelectromechanical systems (MEMS), and may include any process which uses fabrication techniques such as, for example, photolithography, electroplating, sputtering, evaporation, plasma etching, lamination, spin or spray coating, diffusion, or other microfabrication techniques. In general, known MEMS fabrication processes involve the sequential addition or removal of materials, e.g., CMOS materials, from a substrate layer through the use of thin film deposition and etching techniques, respectively, until the desired structure has been achieved.

As noted hereinbefore, MEMS fabrication techniques have been largely derived from the semiconductor industry. Accordingly, such techniques allow for the formation of structures on a substrate using adaptations of patterning, deposition, etching, and other processes that were originally developed for semiconductor fabrication. For example, various film deposition technologies, such as vacuum deposition, spin coating, dip coating, and screen printing may be used for thin film deposition of CMOS layers on the substrate 12 during fabrication of the diaphragm 14. Layers of thin film may be removed, for example, by wet or dry surface etching, and parts of the substrate may be removed by, for example, wet or dry bulk etching.

Micromachined devices are typically batch fabricated onto a substrate. Once the fabrication of the devices on the substrate is complete, the wafer is sectioned, or diced, to form multiple individual MEMS devices. The individual devices are then packaged to provide for electrical connection of the devices into larger systems and components. For example, the embodiment shown in FIG. 2 is one such individual device, i.e., the substrate 12 is a diced portion of a larger substrate used for batch fabrication of multiple identical microspeaker units 10. The individual devices are packaged in the same manner as a semiconductor die, such as, for example, on a lead frame, chip carrier, or other typical package. The processes used for external packaging of the MEMS devices are also generally analogous to those used in semiconductor manufacturing. Therefore, in one embodiment, the present invention contemplates fabrication of an array of CMOS MEMS diaphragms 14 on a common substrate 12 using the batch fabrication techniques.

The substrate 12 may be a non-conductive material, such as, for example, ceramic, glass, silicon, a printed circuit board, or materials used for silicon-on-insulator semiconductor devices. In one embodiment, the micromachined device 14 is integrally formed with the substrate 12 by, for example, batch micromachining fabrication techniques, which include surface and bulk micromachining. The substrate 12 is generally the lowest layer of material on a wafer, such as for example, a single crystal silicon wafer. Accordingly, MEMS devices typically function under the same principles as their macroscale counterparts. MEMS devices, however, offer advantages in design, performance, and cost in comparison to their macroscale counterparts due to the decrease in scale of MEMS devices. In addition, due to batch fabrication techniques applicable to MEMS technology, significant reductions in per unit cost may be realized. This is especially useful in consumer electronics applications where, for example, a large number of high quality, robust and smaller-sized solid-state MEMS diaphragms 14 may be reliably manufactured for earphones with substantial savings in manufacturing costs.

As mentioned earlier, MEMS devices have the desirable feature that multiple MEMS devices may be produced simultaneously in a single batch by processing many individual components on a single wafer. In the present application, numerous CMOS MEMS diaphragms 14 may be formed on a single silicon substrate 12. Accordingly, the ability to produce numerous diaphragms 14 (and, hence, microspeakers or microphones) in a single batch results in a cost saving in comparison to the serial nature in which relevant art audio transducers are manufactured.

As noted before, in addition to decreasing per unit cost, MEMS fabrication techniques also reduce the relative size of MEMS devices in comparison to their macroscale counterparts. Therefore, an acoustic transducer (microspeaker or microphone) manufactured according to MEMS fabrication techniques allows for a smaller diaphragm 14 which, in turn, provides faster response time because of the decreased thickness of the diffusion layer. As described later, the electroacoustic transducer according to the present invention is ideally suited for varied applications such as, for example, in an earphone or in a microphone for audio recordings.

The microspeaker unit 10 may further include additional audio circuitry fabricated on the substrate 12 along with the CMOS MEMS diaphragm 14 as illustrated in FIG. 2. The audio circuitry may include a digital signal processor (DSP) 16, a pulse width modulator (PWM) 18, a sense amplifier 20 and an analog-to-digital (A/D) converter 22. All of this peripheral circuitry may be fabricated on the substrate 12 using well-known integrated circuit fabrication techniques involving such steps as diffusion, masking, etching and aluminum or gold metallization for electrical conductivity.

The microspeaker 10 in FIG. 2 receives a digital audio input at the external pin 24, which is constructed of, for example, aluminum, and is provided as part of the microspeaker unit. The external pin 24 may be inserted into an output jack provided, for example, on a compact disc player unit (not shown) to receive the digital audio input signal. This allows the microspeaker 10 to directly receive an audio signal in a digital format, e.g., in one of a number of PCM (pulse code modulation) formats known in the art. The digital audio input signal is thus a stream of digits (with audio content) from the external audio source, e.g., a compact disc player. The DSP 16 is configured to have two inputs—one for the external digital audio signal at pin 24, and the other for the digital feedback signal from the A/D converter 22.

The digital feedback signal is generated by the sense amplifier 20 which also functions as an electromechanical transducer. The sense amplifier 20 may be implemented as, e.g., an accelerometer or a position sensor, which converts the actual motion of the micromachined diaphragm 14 into a commensurate analog signal at its output. Alternately, the sense amplifier 20 may be implemented as a combination of, e.g., a microphone (or a pressure sensor) and an analog amplifier. The pressure sensor or the position sensor (functioning as an electromechanical transducer) within a sense amplifier 20 may also be constructed using the CMOS MEMS technology. The analog membrane motion signal or feedback signal appearing at the output of the sense amplifier 20 is fed into the A/D (analog-to-digital) converter circuit 22 to generate the digital feedback signal therefrom. In one embodiment, the digital feedback signal is in the same PCM format as the digital audio input so as to simplify signal processing within the DSP 16. Inside the DSP, the digital feedback signal from the A/D converter 22 is compared to the original digital audio input signal from pin 24 and their difference is subtracted from the next digital audio input appearing at the external pin 24 immediately after the original set of digits (or the original digital audio input). This negative feedback action generates a digital audio difference signal at the output of the DSP 16 which is fed into the pulse width modulator unit 18. In one embodiment, the digital audio difference signal is also in the same format as other digital signals within the circuit, i.e., the digital feedback signal from the A/D converter 22 and the digital audio input signal at the pin 24.

The PWM 18 receives the digital audio difference signal and generates a 1-bit pulse width modulated output. The width of the single-bit output pulse depends on the encoding of the digital audio difference signal. The 1-bit pulse-width modulated output from the PWM 18 thus carries in it audio information appearing at the DSP 16 input at pin 24, albeit corrected for any non-linearity and distortion present in the output from the diaphragm 14 as measured by the sense amplifier 20.

The pulse width modulated output bit from the PWM 18 is directly applied to the CMOS MEMS diaphragm 14 for audio reproduction without any intervening low-pass filter stage. The inertia of the micromachined diaphragm 14 allows the diaphragm 14 to act as an integrator (as symbolically indicated by the internal capacitor connection within the diaphragm 14) without the need for additional electronic circuitry for low-pass filtering and digital-to-analog conversion. The diaphragm 14 thus acts both as an analog filter (for low-pass filtering of the 1-bit pulse-width modulated input thereto) and as an electroacoustical transducer that generates audible sound from the received digital 1-bit pulse-width modulated audio input from the PWM 18.

As discussed later hereinafter in conjunction with FIGS. 3A–3D, the diaphragm 14 vibrates in the z-direction (assuming that the diaphragm 14 is contained in the x-y plane) in proportion to the width of the 1-bit pulse-width modulated audio input from the PWM 18. The vibrations of the diaphragm 14 generate the audible sound waves in the adjacent air and, hence, the digital audio input at pin 24 is made audible to the external user. As discussed herein before, the actual vibrations of the diaphragm membrane in response to a given digital audio input at pin 24 may be sensed and "reported" to the DSP 16 using the feedback network including the sense amplifier 20 and the A/D converter 22. The integration of the audio driver circuitry (comprising the PWM 18 and the DSP 16) and the feedback circuitry (including the sense amplifier 20 and the A/D converter 22) on a common silicon substrate allows for precise monitoring and feedback of the diaphragm 14 motion and, hence, correction of any non-linearity and distortion in the acoustical output.

The microspeaker 10 thus functions as a digital-to-acoustic transducer that converts a digital audio input signal directly into an acoustic output without any additional intermediate digital-to-analog conversion circuitry (e.g., low-pass filter circuit) fabricated on the substrate 12. For example, in a portable CD (compact disc) player application, the microspeaker unit 10 may replace the headphone amplifier chip and the D/A (digital-to-analog) converter chip typically included in a CD player. The microspeaker 10 may thus produce very high quality audio directly from digital inputs with distortion of several orders of magnitude less than conventional electroacoustical transducers. Therefore, the microspeaker 10 may be used in audio reproduction units such as audiophile-quality earphones, hearing aids, and telephone receivers for cellular as well as conventional phones.

When the audio input at pin 24 is analog (instead of digital as discussed herein before), a simplified construction of the microspeaker unit 10 may be employed by omitting the DSP unit 16, the pulse width modulator 18 and the A/D converter 22. In such an embodiment, the analog output of the sense amplifier 20 is directly fed to an analog difference amplifier (not shown) along with the analog audio input from the external audio source. The output of the difference amplifier may be added to the analog input at pin 24 through an additional analog amplifier (not shown) prior to sending the output of the analog amplifier to the diaphragm 14.

Another capability of the microspeaker unit 10 is to compensate for various acoustical impedances "on-the-fly", i.e., in real-time or dynamically. It is known that different ambient environments pose different loads on electroacoustical transducers. For example, when the microspeaker unit 10 is coupled to a listener's ear, the tightness of the seal between the ear and the surface of the housing 10 adjacent to the ear may affect the acoustic load presented to the diaphragm 14 and may thus change the frequency response of the diaphragm 14. As another example, it is known that people hold telephones (carrying loudspeakers built into the handsets) with various amounts of leak between the listener's ear and the telephone handset. In one embodiment, the variable acoustic load condition is ameliorated by configuring the DSP 16, using on-chip program control, to generate a test frequency sweep as soon as the microspeaker unit 10 is first powered on and at predetermined intervals thereafter, for example, between two consecutive digital audio input bit streams.

The test frequency may typically be in the audible frequency range. Any desired audio content signal may be used as a test frequency signal for on-the-fly acoustic impedance compensation. Each time the test frequency sweep is sent, the DSP 16, with the help of the feedback network, monitors the vibration and movement of the diaphragm in response to the test frequency and measures the acoustic impedance presented to the diaphragm 14 by the surrounding air pressure or by any other acoustic medium surrounding the diaphragm. The DSP 16 takes into account the measured acoustic impedance and compensates for this acoustic impedance (or load) to ensure a flat frequency response by the diaphragm 14 over a wide range of acoustical loads, thereby creating a load-sensitive acoustic transducer for high quality audio reproduction.

The housing 10 (including the audio circuitry integrated with the CMOS, MEMS diaphragm 14 as in FIG. 2) may be a typical integrated circuit housing constructed of a non-conductive material, such as plastic or ceramic. If the housing 10 and the substrate 12 are both made of ceramic, then the micromachined diaphragm 14, the integrated audio processing circuitry and the housing 10 may be batch fabricated and bonded in batch to produce a hermetically packaged apparatus. In one embodiment, the housing 10 is completely or partially constructed of an electrically conductive material, such as metal, to shield the micromachined diaphragm 14 from electromagnetic interference. In any event, the housing 10 may have appropriate openings or perforations to allow sound emissions (in case of a microspeaker) or sound inputs (in case of a microphone).

In one embodiment, the CMOS MEMS diaphragm 14 is manufactured as a single silicon chip without any additional audio processing circuitry thereon. In other words, the entire fully-integrated circuit configuration with a single substrate, as shown in FIG. 2, is not formed. However, the remaining audio processing circuitry (including the PWM 18, the DSP 16, the A/D converter 22 and the sense amplifier 20) is manufactured as a different silicon chip. These two silicon chips are then bonded together onto a separate acoustic transducer chip and then encapsulated in a housing, thereby creating the complete microspeaker unit similar to that described in conjunction with FIG. 2.

In a still further embodiment, only the CMOS MEMS diaphragm 14 may be manufactured encapsulated within the housing 10; and the remaining audio circuitry may be externally connected to a signal path provided on the housing to electrically connect the micromachined diaphragm 14 with the audio circuitry external to the housing 10. The external circuitry may be formed of discrete elements, or may be in an integrated form. The packaging for the housing 10 may be, for example, a ball grid array (BGA) package, a pin grid array (PGA) package, a dual in-line package (DIP), a small outline package (SOP), or a small outline J-lead package (SOJ). The BGA embodiment, however, may be advantageous in that the length of the signal leads may be comparatively shorter than in other packaging arrangements, thereby enhancing the overall performance of the CMOS MEMS diaphragm 14 at higher frequencies by reducing the parasitic capacitance effects associated with longer signal lead lengths.

Alternately, an array of CMOS MEMS diaphragms 14 (without additional audio processing circuitry) may be produced on a stretch of substrate 12. After fabrication, the substrate 12 may be cut, such as by a wafer or substrate saw, into a number of individual diaphragms 14. The desired encapsulation may then be carried out. In still another alternative, an array of microspeaker units 10 (with each unit including the CMOS MEMS diaphragm 14 and the peripheral audio circuitry discussed hereinbefore) may be fabricated on a single substrate 12. The desired wafers carrying each individual microspeaker unit 10 may then be cut and the encapsulation of each microspeaker unit 10 carried out.

The diaphragm 14 may be used as a diaphragm for a microphone to convert changes in air pressure into corresponding changes in the analog electrical signal at the output of the diaphragm. In that event, the audio circuitry (represented by the units 16, 18, 20 and 22) shown fabricated on the same substrate 12 in FIG. 2 may be absent. Instead, a detection mechanism to detect the varying capacitance of the diaphragm in response to the diaphragm's motion due to audio frequency acoustic waves impinging thereon may be fabricated on the substrate 12. The variations in the diaphragm capacitance may then be converted, through the detection mechanism, into corresponding variations in an analog electrical signal applied to the diaphragm. Typical microphone-related processing circuitry, e.g., an analog amplifier and/or an A/D converter, may also be fabricated on the substrate 12 along with the diaphragm 14 and the variable capacitance detection mechanism (not shown). For the sake of simplicity and conciseness, application of the micromachined diaphragm 14 in a digital loudspeaker unit is only discussed herein. However, it is understood that all of the foregoing discussion as well as the following discussion apply to the use of the CMOS MEMS diaphragm 14 for a microphone application.

Figure 3A:
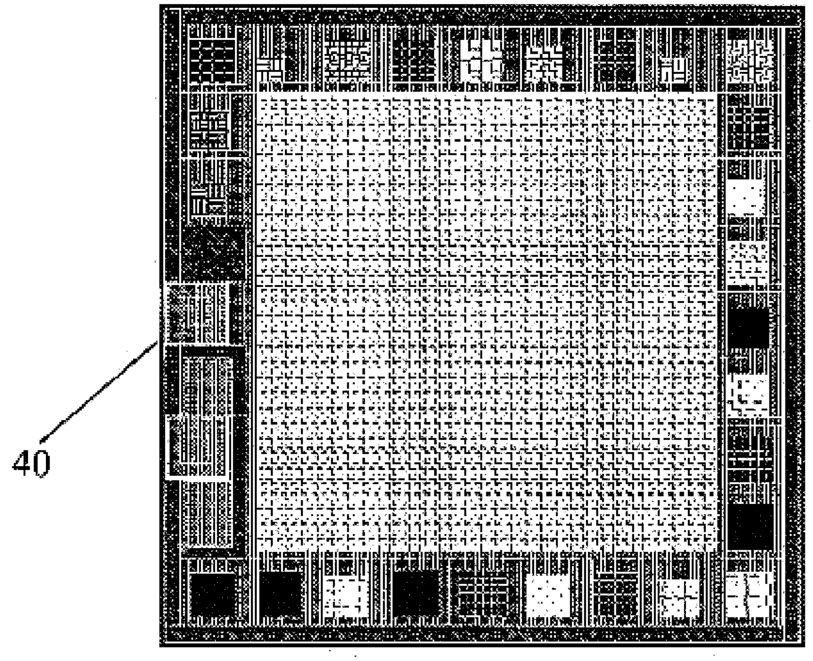
FIG. 3A is an exemplary layout of micromachined structural meshes for CMOS MEMS microspeaker and microphone diaphragms.

Referring now to FIG. 3A, an exemplary layout 40 of micromachined structural meshes for CMOS MEMS microspeakers and microphone diaphragms is illustrated. The layout 40 thus represents the construction details for the diaphragm 14 formed on the substrate 12 using a CMOS MEMS fabrication process. As noted previously, a method according to the present invention used to fabricate an acoustical transducer includes forming a substrate 12, and forming a diaphragm 14 on the substrate 12 by depositing at least one layer of a micromachined membrane on the substrate (as represented by the layout 40). However, the layout 40 is for illustration purpose only, and is not drawn to scale. Further, the layout 40 is for the micromachined diaphragm 14 only, and the audio circuitry shown integrated with the diaphragm 14 in FIG. 2 is not shown as part of the layout 40 in FIG. 3A.

As noted earlier, a larger air movement near a diaphragm is required to generate audible sound. A large CMOS micromachined structure may be formed of more than one layer of CMOS material. However, a large CMOS MEMS structure may curl (in the z-direction) during fabrication due to different stresses in the different layers of the CMOS structure. The metal and oxide layers may typically have different thermal expansion coefficients, and therefore these layers may develop different stresses after being cooled from the processing/deposition temperature to room temperature. The curling of a CMOS membrane in the z-direction may be minimized by using the serpentine spring members for the meshes in the layout 40 as discussed hereinbelow. Furthermore, the structural meshes in the layout 40 are made uniformly compliant in the x-y plane, thereby avoiding the "buckling" or overall shrinkage (in the x-y plane) of the diaphragm structure during the cooling stage in the fabrication process.

Figure 3B:
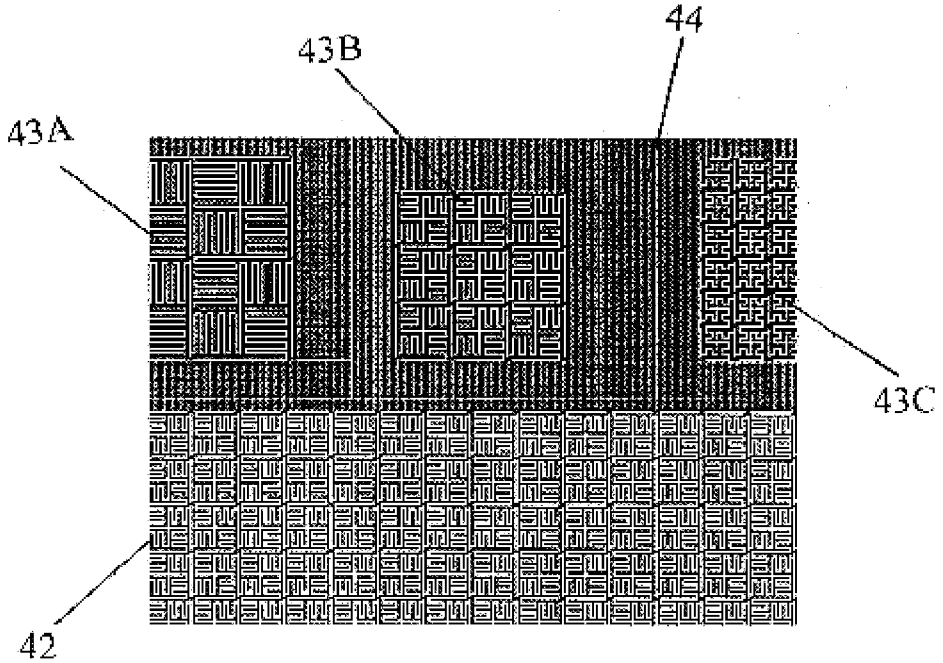
FIG. 3B is a close-up view of the micromachined structural meshes in FIG. 3A.

FIG. 3B is a close-up view of the micromachined structural meshes in FIG. 3A. The bottom portion 42 in FIG. 3B illustrates an expanded view of some of the structural meshes fabricated together using the CMOS MEMS fabrication process. The top portion 44 shows further close-up views of different mesh designs 43 with differing membrane lengths. For example, the meshes 43A, 43B and 43C have different numbers of members, with each member having a different length. However, the layout 40 (and, hence, the diaphragm 14) is fabricated with a large number of meshes similar to the mesh 43B as shown by the close-up view in the bottom portion 42.

Figure 3C:
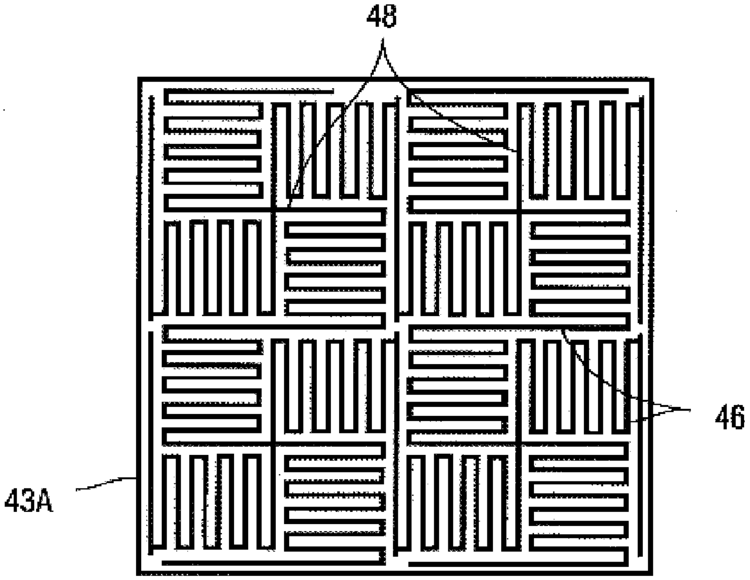
FIG. 3C illustrates a close-up view showing construction details of a mesh depicted in FIG. 3B.

FIG. 3C illustrates a close-up view showing construction details of the mesh 43A depicted in FIG. 3B. The micromachined mesh 43A is formed by utilizing a fabric of a large number of serpentine CMOS spring members. One such micromechanical serpentine spring member 50 is shown hereinafter in conjunction with FIG. 4. The curling (in the z-direction) of the large micromachined diaphragm 14 may be substantially reduced when the diaphragm membrane is made from short members, with frequent changes in direction to allow significant cancellation of the slope generated by the curling. The serpentine spring member 50 satisfies this requirement with a number of alternating longer arms 52 and shorter arms 54 as shown hereinafter in conjunction with FIG. 4.

The mesh 43A is shown comprised of four unit cells 48, with each unit cell having four serpentine spring members. Each unit cell 48 may be square-shaped in the x-y plane as illustrated in FIG. 3C. Alternately, the shapes of unit cells 48 may be a combination of different shapes, e.g., rectangular, square, circular, etc. depending on the shape of the final layout 40. For example, some unit cells may be rectangular in the central portion of the layout 40, whereas some remaining unit cells may be square-shaped along the edges of the layout. The meshed structures in FIGS. 3A–3C may be considered to be lying along the x-y plane containing the diaphragm layout 40. Each longer arm 52 and each shorter arm 54 of a unit cell 48 move along the z-axis when the diaphragm 14 receives the 1-bit pulse-width modulated audio signal from the PWM 18. In the embodiment shown in FIGS. 3A (and in a close-up view in FIG. 3B), the outer edges 46 of those unit cells 48 which lie at the edge (or boundary) of the membrane layout 40 are fixed and, hence, non-vibrating. This may be desirable to hold the diaphragm membrane in place during actual operations. However, the outer edges 46 for all other non-boundary unit cells 48 may not be fixed and, hence, may be freely vibrating. However, on the average, the outer edges 46 of all unit cells remain fairly level during vibrations because of the opposite torques exerted by the neighboring unit cells that share common outer edges 46.

Figure 3D:
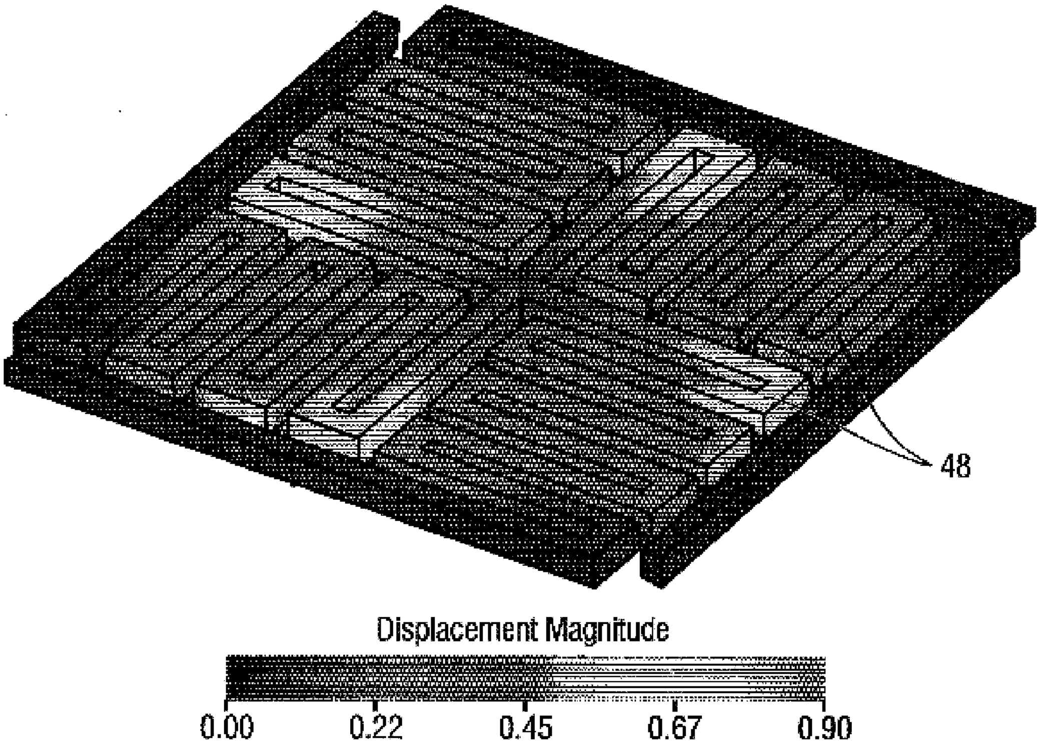
FIG. 3D shows a MEMCAD curl simulation of a unit cell in the mesh shown in FIG. 3C.

FIG. 3D shows a MEMCAD curl simulation of the unit cell 48 in the mesh 43A shown in FIG. 3C. The shape of each longer arm 52 and each shorter arm 54 is a rectangular box as shown in the three-dimensional view of the unit cell 48. All of these rectangular box or bar shaped members are joined during CMOS MEMS fabrication process to form the diaphragm 14. The maximum curling (as represented by the white colored areas in the three-dimensional simulation view in FIG. 3D) is shown to be substantially curtailed (averaging around 0.7 micron) due to the serpentine spring fabrication of unit cell members. The outer edges 46 (which are fixed just for simulation of a single unit cell 48) are not visible in FIG. 3D because of almost no curling at the outer edges (as represented by the dark black color in the displacement magnitude indicator bar at the bottom). Typically, the roughness in the CMOS diaphragm structure caused by curling during fabrication may be curtailed at or below about two microns using the serpentine spring members for the CMOS diaphragm membrane.

Figure 4:
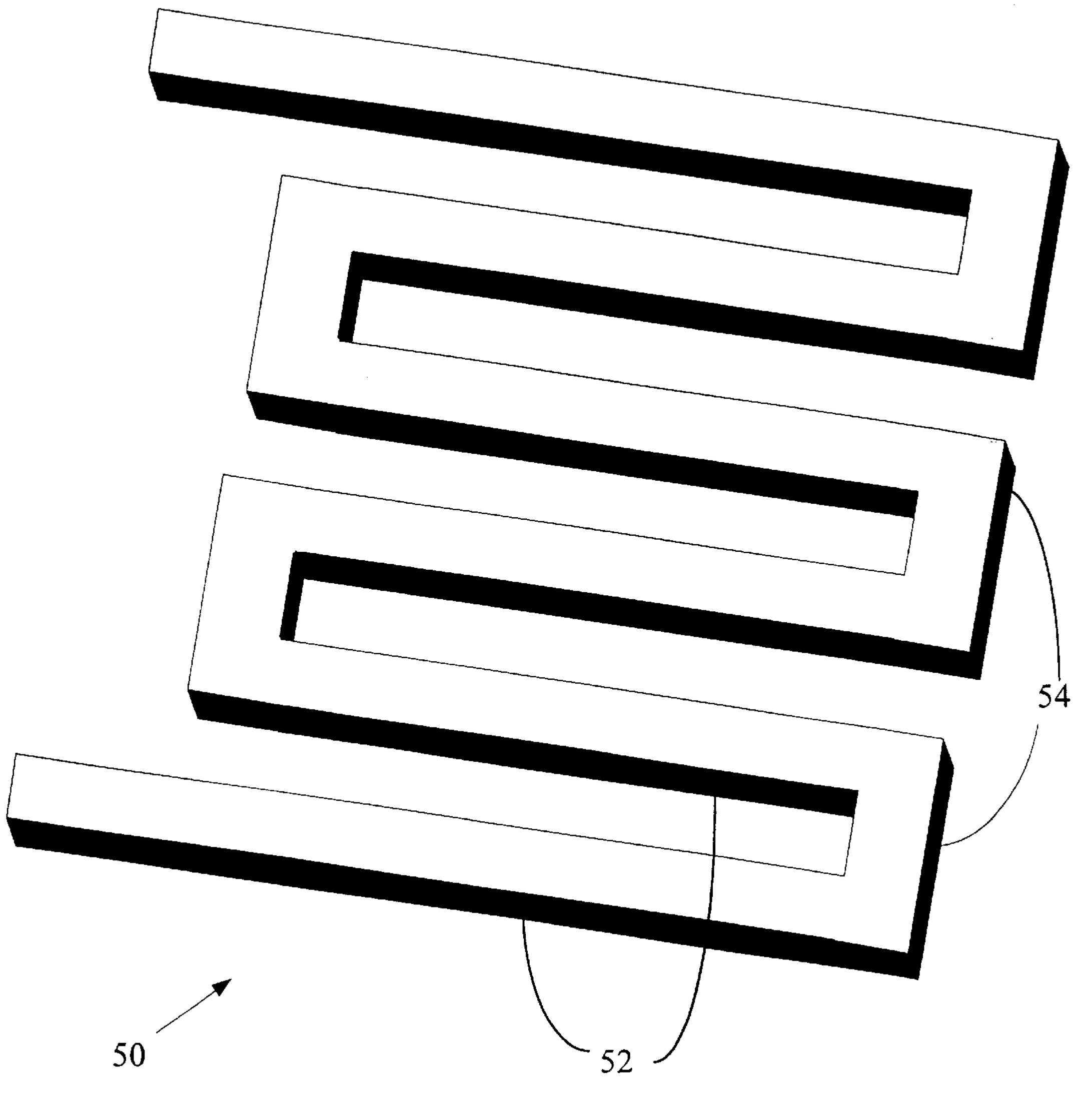
FIG. 4 shows a three-dimensional view of an individual serpentine spring member in a mesh shown in FIG. 3B.

Referring now to FIG. 4, a three-dimensional view of an individual serpentine spring member 50 in the mesh 43B in FIG. 3B is shown. As depicted in FIG. 3B, each such serpentine spring member is the basic structural unit for the larger mesh structure. A large number of serpentine spring members are joined through their corresponding longer arms 52 to form a network of densely packed unit cells, thereby forming a mesh as illustrated in the close-up view in the bottom portion 42 of FIG. 3B. The factors such as the size of a mesh, the number of meshes, the gap between adjacent meshes, the gaps between adjacent members in a mesh, the width and length of mesh members, etc., are design specific.

For the layout 40 in FIG. 3A, the gap between adjacent longer arms 52, the width of the longer and the shorter arms, and the number of the longer and the shorter arms in the spring 50 are varied during the curl simulation process to see their effects on the curl (in the z-direction) in the final diaphragm produced through the MEMS fabrication process. For example, in one embodiment (for testing purpose only), the widths of the longer and the shorter arms, and the gaps between the longer arms are combinations of 0.9, 1.6 or 3.0 microns (depending on the desired curl) for meshes near the edge of the die for the diaphragm 14. In that test embodiment, the diaphragm 14 has a large, square-shaped, central mesh measuring 1.4416 mm by 1.4416 mm. The width of each longer and shorter arm constituting this central mesh is 1.6 microns, and the gap between each longer arm in this central mesh is also 1.6 microns. However, it is noted that in an actual earphone or in a commercial microspeaker, the CMOS MEMS diaphragm 14 may have serpentine springs with one fixed dimension for the widths of the longer and the shorter arms and another fixed dimension for the gaps between the longer arms.

After the CMOS MEMS diaphragm 14 is released following fabrication using, for example, the MOSIS (Metal Oxide Semiconductor Implementation System) process, one or more layers of a sealant, e.g., polyimide (preferably, pyralin), may be deposited on top of the CMOS MEMS diaphragm structure to create an air-tight diaphragm. Excess sealant may be etched away depending on the desired thickness of the sealant. Because the gap between two adjacent longer arms 52 is controllable during the fabrication process, the effect of such a gap on the etch rate of the underlying silicon substrate (because of the sealant deposit) may be easily observed. Additionally, a designer may ascertain how large of a gap (between adjacent longer arms 52) is permissible before the sealant "drips" through (towards the substrate 12) after deposit. The viscosity of the sealant is thus an important factor in controlling such "dripping." In an alternative embodiment, the released CMOS MEMS diaphragm structure may be laminated by depositing a Kapton® film (or any similar lamination film) on top of the die for the MEMS diaphragm. Again, the lamination film may be partially etched away depending on the desired thickness of the final CMOS diaphragm membrane.

Mathematical Behavior Modeling for a Sample MEMS Diaphragm Unit

The following discussion uses a system of units based on small dimensions for the quantity to be measured. Thus, 'mass' is measured in nanograms (ng); 'length' is measured in micrometers ($\mu$m); 'time' is measured in microseconds ($\mu$s); and electric charge is measured in picocoulombs (pC).

The following quantities may be derived using the above-mentioned "base" units: 'force'[=(mass×length)/(time)$^2$] is measured in micronewtons ($\mu$N); 'energy'[=force×distance] is measured in picoJoules (pJ); 'pressure'[=force/area] and Young's modulus are measured in MegaPascals (MPa); 'density'[=mass/volume] is measured in ng/($\mu$m)$^3$; 'electric potential'[=energy/charge] is measured in volts (V); 'capacitance' is measured in picoFarads (pF); 'resistance'[=voltage/current] is measured in megaohms [MΩ]; 'current'[=charge/time] is measured in microamperes ($\mu$A); 'angular frequency' is measured in radians/microseconds=rad/$\mu$s; and 'sound pressure level'[=20 log(pressure/$P_0$)] is measured in decibels (dB) with the reference pressure $P_0$=20 $\mu$Pa. It is noted that any quantity that is not labeled with a unit may be assumed to have units derived from the above-mentioned quantities.

The following constants are used in relevant calculations: 'density of air' ($\rho_{air}$) under normal conditions=1.2×10$^{-6}$; 'speed of sound' (c)=343; 'acoustic impedance of air'[=(density of air)×(speed of sound)]=412×10$^{-6}$; 'viscosity of air'[=force/area/(velocity gradient)] ($\mu_{air}$)=1.8×10$^{-5}$; 'density of silicon' ($\rho_{Si}$)=2.3×10$^{-3}$; 'density of polyimide' ($\rho_{poly}$)=1.4×10$^{-3}$; Young's modulus for polyimide (E)=3000; Poisson number of polyimide (ν)=0.3; 'permeability of free space' ($\epsilon_0$)=8.85×10$^{-6}$ pF/$\mu$m; and 'acoustic compliance of air in ear canal' [assuming a volume of 2 cm$^3$ of the ear canal]=(volume)/($\rho_{air}$×c$^2$)=1.4×10$^{-13}$.

The following basic acoustic formulas are used analogously with electric circuits. Thus, 'acoustic resistance' (R)=($\rho_m$×c)/A, where A is the cross-sectional area of the tube of medium 'm' carrying the sound waves; 'acoustic inductance' (L)=($\rho_m$×l)/A, where A is the cross-sectional area of the tube of medium 'm' and length 'l' carrying the sound waves; 'acoustic compliance' (C) (analogous to electrical capacitance)=(volume)/($\rho_{air}$×c$^2$), where 'volume' represents the volume of air in the tube carrying the sound waves; 'volume velocity' (analogous to electrical current) (U)=p/Z, where 'p' is pressure (analogous to electrical potential difference to AC or signal ground) and 'Z' is 'acoustic impedance' which has units of [ng/($\mu$s×$\mu$m$^4$)].

Figure 5:
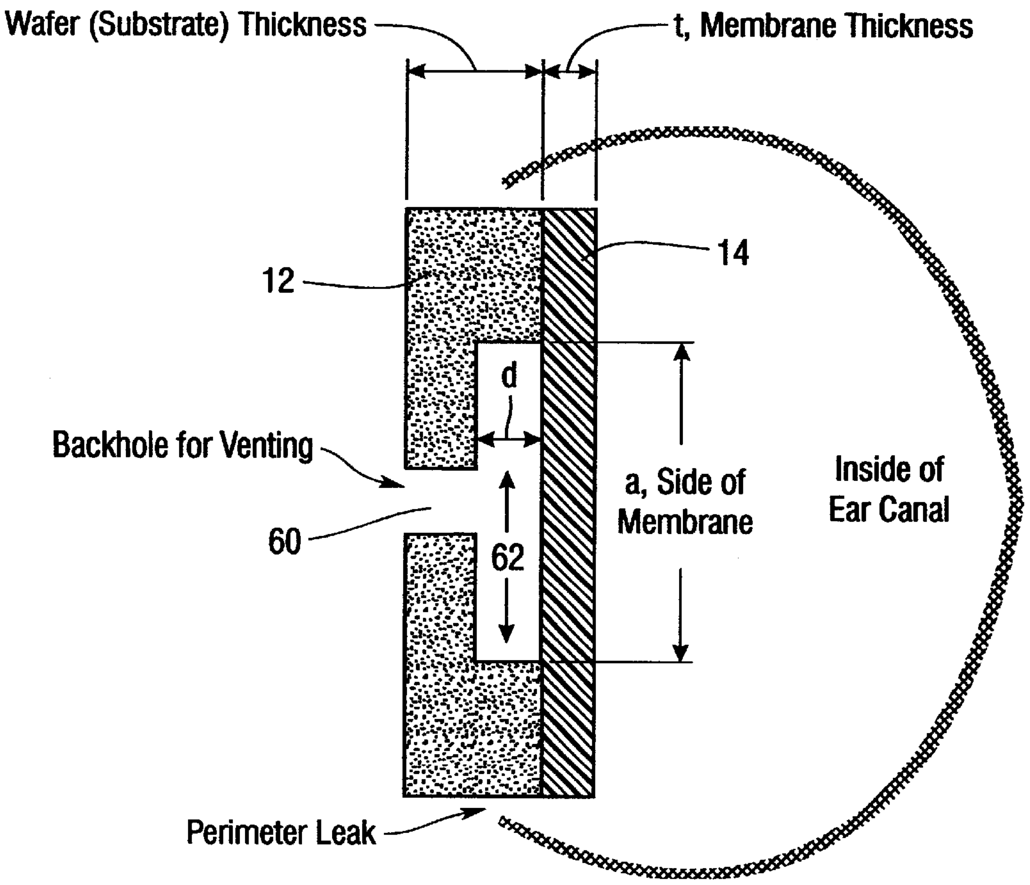
FIG. 5 illustrates a cross-sectional schematic showing a MEMS diaphragm according to the present invention placed over a user's ear.

Referring now to FIG. 5, a cross-sectional schematic is illustrated showing a MEMS diaphragm 14 according to the present invention placed into a user's ear. As noted before, the diaphragm membrane 14 may have a sealant (e.g., polyimide) deposited over it for air-tightness. Here, as illustrated in FIG. 5, the membrane thickness 't' includes a six (6)-micron-thick layer of polyimide deposit. The cross-section (into the plane of the paper depicting FIG. 5) of the complete assembly (i.e., the diaphragm 14 and the substrate 12) is square-shaped. The effective area of the diaphragm 14 for audio reproduction is square-shaped with each side of the square having length 'a'=1.85 mm. The thickness of the substrate 12 is 500 microns, and the diaphragm membrane is suspended at a distance ('d') of about 10 microns from the underlying substrate 12, creating a substrate-diaphragm gap 62 as illustrated in FIG. 5.

The substrate 12 is shown to have a hole 60 on its back side (i.e., the side facing away from the user) for air venting. In one embodiment, the substrate 12 has more then one hole (not shown in FIG. 5) spread out on its back side, for example, over an area equal to a square with side 'a'. These backholes are different from any holes provided on the diaphragm housing in the direction facing the ear canal for audio transmission when the housing (e.g., an earphone) is inserted into the ear canal. For the present calculations, it is estimated that the area of the single backhole 60 (or the plurality of backholes, whatever the case may be) equals ¼ of the total diaphragm 14 membrane area.

In the arrangement shown in FIG. 5, the diaphragm membrane 14 is pulled electrostatically (within the gap 62) toward the substrate 12 (i.e., in the z-direction) when a potential difference (or bias) is applied across the membrane, as, for example, when a battery or other source of electrical power energizes the diaphragm 14. In the present example, the DC bias voltage is 9.9 volts. The diaphragm 14 remains pulled toward the substrate 12 in the absence of any AC audio signal (e.g., the 1-bit PWM signal in FIG. 2), but moves in the z-direction in response to the received electrical audio signal. The AC audio signal is 5 volts peak-to-peak superimposed on the DC bias voltage.

It is assumed that the microspeaker unit (including the substrate 12 and the diaphragm 14) is placed into the user's ear as shown in FIG. 5, i.e., with the membrane facing the ear canal. The microspeaker unit may be manufactured as an earphone (or earplug), thus allowing a user to insert the earphone into the ear when listening, for example, to music from a compact disc player. Ideally, the best hearing performance may be achieved when there is a snug (airtight) fit between all the four edges of the diaphragm 14 and the skin of the ear surrounding these diaphragm edges. However, in reality, there may be some acoustic leakage due to imperfect fitting conditions. Therefore, for calculations, it is assumed that the area of the audio leak has a cross section equal to the perimeter (=8 mm) of the complete diaphragm 14 surface (which is a square of 2 mm sides) multiplied by the perimeter leak gap of about 0.2 mm (also assumed for the purpose of calculations).

In order to calculate the frequency response of the diaphragm membrane (or, simply, 'membrane') 14, it may be desirable to take into account the behavior of the membrane 14 in a vacuum (similar to an undamped spring-mass system) and the acoustic behavior of its surroundings. For a given applied DC bias and the applied AC signal strength, the membrane 14 may be treated as a source of current (in the electrical equivalent model shown hereinafter in conjunction with FIG. 6) which depends on the voltage difference across it as well as on the driving frequency. This behavior may be summarized in an equation describing the membrane 14 as a spring-mass system that is driven with a sinusoidal electrical force (in one direction), and also experiencing forces (in the same direction, e.g., the z-direction) from the pressure difference (i.e., the DC bias voltage) on its two sides. A computational model based on a sinusoidal electrical force may quite accurately represent the behavior of the diaphragm when a pulse (e.g., the 1-bit PWM audio signal in FIG. 2) is applied to the diaphragm membrane because a pulse may be represented as comprising one or more sinusoidal frequencies. The frequency-domain equation for such a spring-mass system using Newton's second law of motion is:

$$-m\omega^2 y = -ky - (p' - p)S + f \tag{1}$$

where: 'm' is mass; 'ω' is the angular frequency; 'y' is the displacement of the membrane (positive value for inward displacement, i.e., away from the ear canal or into the gap 62, and negative value for outward displacement, i.e., towards the ear canal); 'k' is the effective spring constant when the membrane is displaced to the midpoint of the gap 62 in FIG. 5; 'p'' is the air pressure between the membrane 14 and the substrate 12 in the gap 62; 'p' is the air pressure in the ear canal; 'S' is the cross-sectional area ($=a^2$) of the membrane; and 'f' is the applied electrostatic force between the membrane 14 and the substrate 12. Equation (1) may alternately be represented as: [(mass×acceleration)=elastic force of membrane+force from pressure difference+electrical force]. In equation (1), 'y', 'p', 'p'', and 'f' are all phasor quantities. It is noted further that at all but the highest audio frequencies, the pressure 'p' may be treated as uniform throughout the ear canal because the sound wavelength is much longer than the typical length of the ear canal at all but the highest audio frequencies.

Figure 6:
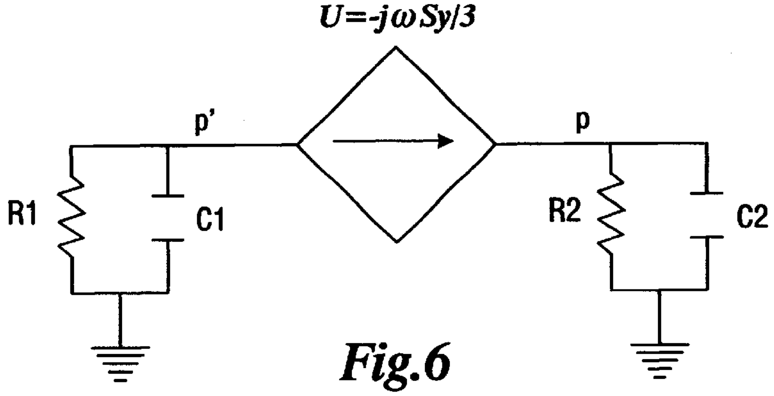
FIG. 6 represents an acoustic RC model of the arrangement shown in FIG. 5.

Turning now to FIG. 6, an acoustic RC model of the arrangement shown in FIG. 5 is represented. It can be shown that the acoustic inertance of both the backside hole (or holes) 60 and the perimeter leak may be neglected at audio frequencies. It was mentioned earlier that the analysis herein models the membrane 14 as a spring-mass system in a vacuum. Therefore, resistance needs to be introduced to get damping for the spring-mass system. The resistance may preferably be near the surface of the diaphragm 14 so that a significant force (through air pressure) may be felt by the diaphragm. One such resistance is the air resistance created in the gap 62 between the backhole 60 in the substrate 12 and the surface of the diaphragm 14 closest to the backhole 60.

In FIG. 6, '$R_1$' is the acoustic resistance provided by the backside hole 60 (or holes) to the diaphragm surface whereas '$C_1$' is the compliance of the air trapped within the gap 62 (i.e., the air in the gap of width 'd'). Similarly, '$R_2$' is the acoustic resistance of the leak around the perimeter of the diaphragm assembly (i.e., the diaphragm 14 and the substrate 12 in FIG. 5), and '$C_2$' is the compliance of the air in the ear canal. The ear canal may be viewed as forming a closed-end cylinder with the diaphragm 14 (with effective acoustic dimension 'a') acting as a piston within that cylinder. The movement of the diaphragm 14 (due to any audio inputs) thus results in air pressure vibrations within the ear canal and, hence, the user may comprehend the resulting audio sounds.

One end of the acoustic resistance $R_1$ is represented as grounded in FIG. 6 because it can be shown that the pressure p' on the membrane side of the resistance $R_1$ (of the backhole 60) is substantially greater than any pressure exerted by the ambient air on the other side (i.e., away from the diaphragm-substrate gap 62) of the backhole 60. Similarly, one end of the acoustic leak resistance $R_2$ may also be represented as connected to the ground. As noted before, the deflection 'y' of the diaphragm 14 takes on positive value when the diaphragm membrane moves toward the substrate 12 (i.e., away from the ear canal). However, the volume velocity 'U', modeled as a current source in FIG. 6, has the opposite convention of being positive, i.e., volume velocity 'U' is positive when the air is moving into the ear canal. Therefore, 'jωy' (membrane velocity in frequency domain) and 'U' have opposite signs in FIG. 6.

The relationship between the volume velocity 'U' and displacement 'y' is given as: $U=-j\omega Sy/3$. The factor of ⅓ is an attempt to take into account the shape of the diaphragm membrane when deflected. As described above, 'y' depends on f, p, and p'. From FIG. 6, the values for p and p' are given as:

$$p' = -UZ_1, \text{ where } Z_1 = \left[\frac{1}{R_1} + j\omega C_1\right]^{-1} \text{ and} \tag{2}$$

$$p = +UZ_2, \text{ where } Z_2 = \left[\frac{1}{R_2} + j\omega C_2\right]^{-1} \tag{3}$$

Equations (1), (2) and (3) may be solved together using a computer program (e.g., the Maple™ worksheet program) to get sound pressure levels (i.e., p and p') in terms of the applied force f. However, it still remains to find the relationship of f to the applied voltages (denoted by the letters 'v' for the AC input, and 'V' for the DC bias), the effective mass ('m') and the spring constant ('k'). The applied force f is proportional to the AC audio input 'v' for small signals, and is:

$$f = v\left[\frac{dF}{dV}\right] = \frac{2v\varepsilon_0 SV}{(d-y)^2} \tag{4}$$

where $F=k_1y+k_3y^3$ (formula representing force 'F' as a function of deflection 'y'), and also:

$$F = \frac{\varepsilon_0 V^2 S}{(d-y)^2} \tag{5}$$

where F is the electrostatic force at deflection 'y' for applied DC bias voltage V. In the Maple™ worksheet calculations given below, the values of 'F', 'y' and 'V' are called $f_0$, $y_0$ and $V_0$ to indicate that they are values for the operating point. Further, it is assumed that $y_0=d/2$ (where 'd' represents the width of the gap as shown in FIG. 5). In other words, the membrane 14 is operated around a position in the middle of the substrate-membrane gap 62. Therefore, $f_0$ represents the electrostatic force required to bring the membrane to the position $y_0$, and $V_0$ is the electrostatic potential difference required to create the force $f_0$.

The effective spring constant 'k' at the operating position $y_0$ may be calculated from the above formula for the force 'F' (i.e., $F=k_1y+k_3y^3$) as given below:

$$k = \frac{dF}{dy}\bigg|_{(y=y_0)} = k_1 + 3k_3y^2 \tag{6}$$

The values of $k_1$ and $k_3$ may be looked up in handbooks, e.g., in "Roark's Formulas For Stress And Strain". Although there is no simple formula for a square plate (i.e., for the shape of the diaphragm membrane 14), the values for $k_1$ and $k_3$ may be estimated from those for a fixed-edge circular membrane of radius R using the following equation:

$$\frac{qR^4}{(Et^4)(1-v^2)} = (5.33)\frac{y}{t} + (2.6)\left(\frac{y}{t}\right)^3 \tag{7}$$

where 'E' represents Young's modulus (for polyimide), and 'v' (nu) is the Poisson number (of polyimide). Replacing the radius 'R' in equation (7) with 'a/2' (i.e., half the length of a side of the square-shaped membrane surface into the ear canal) may provide reasonable approximations for $k_1$ and $k_3$ in modeling the behavior of a square membrane. The resulting equations are:

$$k_1 = \frac{85Et^3}{[a^2(1-v^2)]} \text{ and,} \tag{8}$$

$$k_3 = \frac{42Et}{[a^2(1-v^2)]} \tag{9}$$

The effective mass of the membrane 14 may be somewhat less than the total mass of the membrane because the center of the membrane, which defines the position 'y', may deflect more than the regions near the edges (e.g., the edges 46 shown in the close-up view in FIG. 3C). An estimate for the effective mass of the membrane may be given as:

$$m = \frac{\rho_{poly}tS}{3} \tag{10}$$

where $\rho_{poly}$ is the density of polyimide, 't' is the membrane thickness (as shown in FIG. 5), and 'S' is the effective area of the membrane 14 for acoustical purpose ($=a^2=(1.85\ \text{mm})^2$).

The above-described equations and parameters may be input into a mathematical calculation software package (e.g., the Maple™ worksheet program mentioned before) to compute various values (e.g., values for $R_1$, $C_1$, $R_2$, etc.) to determine and plot membrane frequency response and displacement over the audio frequency range. The computations performed using the Maple worksheet are listed below.

Maple™ worksheet calculations specify membrane parameters:

>restart;

>a:=1850; t:=6; E:=3000; ν:=0.3; $\rho_{poly}$:=$1.4\times10^{-3}$;

>S:=$a^2$; area of membrane

S:=3422500 specify gap spacing, operating position (measured from equilibrium position)

>d:=10; $y_0$:=d/2=5;

force needed to pull membrane down to $y_0$:

$$> k_1 := \text{evalf}\left(\frac{85Et^3}{[a^2(1-v^2)]}\right);\ k_3 := evalf\left(\frac{42Et}{[a^2(1-v^2)]}\right);$$

$k_1$:=17.68516363

$k_3$:=0.2427375400

>$f_0$:=$k_1y_0+k_3y_0^3$;

$f_0$:=118.7680107 find bias voltage needed to bring membrane to $y_0$

>$\epsilon_0$:=$8.85\times10^{-6}$; permeability of vacuum $$> V_0 = (d-y_0)\sqrt{\frac{f_0}{\varepsilon_0 S}}\ \text{; the DC bias voltage}$$

$V_0$ :=9.900938930 specify amplitude of signal (the AC audio input) superimposed on the DC bias voltage >v:=5 (peak-to-peak);

calculate amplitude of force generated by electrical signal $$> f := \frac{2v\varepsilon_0 S V_0}{(d-y_0)^2};$$

f:=119.9563108 calculate effective mass; ⅓ factor is estimated $$> m := \frac{\rho_{poly}tS}{3};$$

m:=9582.999999 calculate effective spring constant at operating point

>k:=$k_1+3k_3y_0^2$;

k:=35.89047913 estimated resonant frequency in Hertz (not necessary to calculate)

$$> \text{res\_freq} := \frac{10^6}{2\pi\sqrt{\frac{k}{m}}};$$

res_freq:=9739.978540

>p':=$-UZ_1$; p:=$UZ_2$; pressures in terms of volume velocity and acoustic impedances get amplitude phasor as a function of membrane properties, driving force, and pressures on both side of membrane get U (volume velocity) in terms of displacement >U:=−jωyS/3; ⅓ to consider shape of membrane $$U := \frac{-j\omega y(3422500)}{3}$$

>expr:=$-m\omega^2y=-ky-(p'-p)S+f$;

$$expr := (-9582.999999)(\omega^2 y) = \frac{(11713506250000)j\omega y Z_1}{3} +$$

-continued $$\frac{(11713506250000)j\omega y Z_2}{3} - (35.89047913y) + 119.9563108$$

>y:=solve(expr,y);

$$y := \frac{-(0.3598689324)10^{11}}{[(0.2874900000)10^{13}\omega^2 + (0.1171350625)10^{22}j\omega Z_1 + (0.1171350625)10^{22}j\omega Z_2 - (0.1076714374)10^{11}]}$$

impedance of ear canal, inside of device $$> Z_2 = \left[\frac{1}{R_2} + j\omega C_2\right]^{-1}; Z_1 = \left[\frac{1}{R_1} + j\omega C_1\right]^{-1};$$

acoustic parameters: device compliance, resistance, ear canal compliance, leak resistance >$\rho_{air}$:=1.2×10$^{-6}$; c:=343; air density, speed of sound $$> C_1 := \frac{(d-y_0)S}{\rho_{air}c^2}; R_1 := \frac{\rho_{air}c}{\left(\frac{S}{4}\right)}; C_2 := 1.4\times 10^{13}; R_2 := \frac{\rho_{air}c}{(200\times 8000)};$$

$C_1$:=(0.1212115417)×10$^{9}$ $R_1$:=(0.4810518628)×10$^{-9}$ $C_2$:=(0.14)×10$^{14}$ $R_2$:=(0.2572500000)×10$^{-9}$ 0 dB definition >$p_0$:=2×10$^{-11}$;

get amplitude of membrane displacement, ear canal pressure, internal pressure of device >$y_{amp}$:=evalc(abs(y)); $p_{amp}$:=evalc(abs(p)); $p'_{amp}$:=evalc(abs(p'));

$$y_{amp} := \frac{(.3598689324)10^{11}}{\sqrt{\alpha^2+\beta^2}}, \text{ where}$$

$$\alpha = (0.2874900000)10^{13}\omega^2 + \frac{(0.1419812151)10^{30}\omega^2}{(0.4321317720)10^{19} + (0.1469223784)10^{17}\omega^2} + \frac{(0.1639890875)10^{35}\omega^2}{(0.1511086178)10^{20} + (0.196)10^{27}\omega^2} - (0.1076714374)10^{11}$$

and $$\beta = \frac{(0.2434977838)10^{31}\omega}{(0.4321317720)10^{19} + (0.1469223784)10^{17}\omega^2} + \frac{(0.4553355199)10^{31}\omega}{(0.1511086178)10^{20} + (0.196)10^{27}\omega^2}$$

$p_{amp}$:=(0.4105504736)10$^{17}\sqrt{\theta^2+\phi^2}$, where $$\theta = \frac{(0.3887269193)10^{10}\omega(\%4)}{(\%4^2+\%3^2)(\%1)} - \frac{(0.14)10^{14}\omega^2(\%3)}{(\%4^2+\%3^2)(\%1)}, \text{ and}$$

$$\phi = \frac{(-0.3887269193)10^{10}\omega(\%3)}{(\%4^2+\%3^2)(\%1)} - \frac{(0.14)10^{14}\omega^2(\%4)}{(\%4^2+\%3^2)(\%1)}$$

where $$\%1 := (0.1511086178)\times 10^{20} + (0.196)\times 10^{27}\omega^2$$

-continued $$\%2 := (0.4321317720)\times 10^{19} + (0.146922784)\times 10^{17}\omega^2$$

$$\%3 := (0.2434977838)\times 10^{31}\frac{\omega}{\%2} + (0.4553355199)\times 10^{31}\frac{\omega}{\%1}, \text{ and}$$

$$\%4 := (0.2874900000)\times 10^{13}\omega^2 + (0.1419812151)\times 10^{30}\frac{\omega^2}{\%2} + (0.1639890875)\times 10^{35}\frac{\omega^2}{\%1} - (0.1076714374)\times 10^{11}$$

$$p'_{amp} := (0.4105504736)\times 10^{17}\sqrt{\lambda^2+\delta^2},$$

where $$\lambda = \frac{(0.2078777939)10^{10}\omega(\%4)}{(\%4^2+\%3^2)(\%1)} - \frac{(0.1212115417)10^{9}\omega^2(\%3)}{(\%4^2+\%3^2)(\%1)}, \text{ and}$$

$$\delta = \frac{(-0.2078777939)10^{10}\omega(\%3)}{(\%4^2+\%3^2)(\%1)} - \frac{(0.1212115417)10^{9}\omega^2(\%4)}{(\%4^2+\%3^2)(\%1)}$$

where $$\%1: = (0.4321317720)\times 10^{19} + (0.1469223784)\times 10^{17}\omega^2$$

$$\%2: = (0.1511086178)\times 10^{20} + (0.196)\times 10^{27}\omega^2$$

$$\%3: = (0.2434977838)\times 10^{31}\frac{\omega}{\%1} + (0.4553355199)\times 10^{31}\frac{\omega}{\%2}, \text{ and}$$

$$\%4: = (0.2874900000)\times 10^{13}\omega^2 + (0.1419812151)\times 10^{30}\frac{\omega^2}{\%1} + (0.1639890875)\times 10^{35}\frac{\omega^2}{\%2} - (0.1076714374)\times 10^{11}$$

convert $\omega$ in $\frac{1}{\mu s}$ to frequency in Hertz

>ω:=2π(freq)(10$^{-6}$);

ω:=(0.628318)×10$^{-5}$×(freq)

>with(plots):semilogplot(20log$_{10}$($p_{amp}$/$p_0$), freq=10 . . . 40000, 30 . . . 100); Semilog plot inside ear canal >semilogplot($y_{amp}$, freq=10 . . . 40000); amplitude of membrane vibration (can't exceed d/2)

Figure 7:
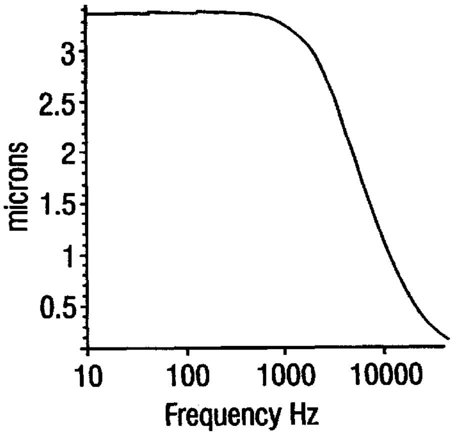
FIG. 7 is a semilog plot illustrating the frequency response of the CMOS MEMS diaphragm according to the present invention.
Figure 8:
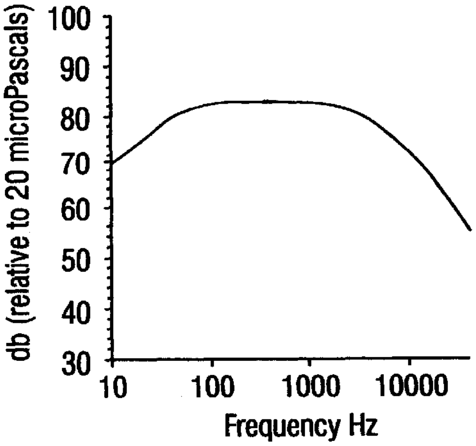
FIG. 8 is a graph showing the displacement of the MEMS diaphragm in response to a range of audio frequencies.

The results obtained from the foregoing mathematical computations are plotted in FIGS. 7 and 8. FIG. 7 is a graph showing the displacement of the MEMS diaphragm in response to a range of audio frequencies, and FIG. 8 a semilog plot illustrating the frequency response of the CMOS MEMS diaphragm 14 according to the present invention. As noted before, the y-axis in FIG. 7 represents the membrane displacement in microns, and the y-axis in FIG. 8 represents sound pressure levels (in the ear canal) in decibels (dB) relative to 20 μPa. The x-axis in both of the plots represents audio frequency in Hertz (Hz).

The foregoing describes construction and performance modeling of an electroacoustic transducer, which can be used in a microspeaker or a microphone. The acoustic transducer is manufactured as a single chip using a CMOS MEMS (microelectromechanical systems) fabrication process at a lower cost of production in comparison to relevant art acoustic transducers. The acoustic transducer according to the present invention converts a digital audio input signal directly into a sound wave. The serpentine spring construction of CMOS members constituting the acoustic transducer allows for reduction in curling (or membrane members) during fabrication. The size of the acoustic transducer can also be reduced in comparison to relevant art audio transducers. Additional audio circuitry including a digital signal processor, a sense amplifier, an analog-to-digital converter and a pulse width modulator may also be integrated with the acoustic transducer on a single silicon chip, resulting in a very high quality sound reproduction. The non-linearity and distortion in frequency response are corrected with on-chip negative feedback, allowing substantial improvement in sound quality. The acoustic transducer of the present invention is capable of on-the-fly compensation for changing acoustical impedances, thereby ensuring a substantially flat frequency response over a wide range of acoustical loads.

While several preferred embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alteration and adaptations without departing from the scope and spirit of the present invention as defined by the appended claims.

What is claimed is:

1. A flexible diaphragm fabricated on a substrate, comprising:

a micromachined membrane fabricated on the substrate; and a layer of material sealing said membrane.

2. The flexible diaphragm of claim 1 wherein said micromachined membrane includes a serpentine shaped spring.

3. The flexible diaphragm of claim 2 wherein said serpentine shaped spring is comprised of a plurality of alternately positioned long and short arms.

4. The flexible diaphragm of claim 3 wherein a longest side of each of said long arms is less than approximately 50 microns in length.

5. The flexible diaphragm of claim 3 wherein a maximum spacing between adjacent arms is approximately 3 microns.

6. The flexible diaphragm of claim 1 wherein said micromachined member includes a plurality of cells, each cell comprised of a plurality of serpentine shaped springs.

7. The flexible diaphragm of claim 1 wherein the substrate is selected from a group consisting of ceramic, glass, silicon, printed circuit board, and silicon-on-insulator semiconductor devices.

8. The flexible diaphragm of claim 1 wherein said layer of material is selected from a group consisting of polymer sealants.

9. The flexible diaphragm of claim 1 wherein the diaphragm is fabricated in an x-y plane and supported by the substrate so as to be free to move in a z direction.

10. The flexible diaphragm of claim 9 wherein the diaphragm is supported by the substrate such that changes in air pressure result in movement of the diaphragm.

11. The flexible diaphragm of claim 9 wherein the diaphragm is supported by the substrate such that the diaphragm moves when actuated with an electrical signal.

12. A flexible diaphragm fabricated on a substrate, comprising:

a micromachined membrane comprised of a plurality of serpentine shaped springs; and a layer of material sealing said membrane.

13. The flexible diaphragm of claim 12 wherein each of said serpentine shaped springs is comprised of a plurality of alternately positioned long and short arms.

14. The flexible diaphragm of claim 13 wherein a longest side of each of said long arms is less than approximately 50 microns in length.

15. The flexible diaphragm of claim 13 wherein a maximum spacing between adjacent arms is approximately 3 microns.

16. The flexible diaphragm of claim 12 wherein said micromachined member includes a plurality of cells, each cell comprised of a plurality of serpentine shaped springs.

17. The flexible diaphragm of claim 12 wherein the substrate is selected from a group consisting of ceramic, glass, silicon, printed circuit board, and silicon-on-insulator semiconductor devices.

18. The flexible diaphragm of claim 12 wherein said layer of material is selected from a group consisting of polymer sealants.

19. The flexible diaphragm of claim 12 wherein the diaphragm is fabricated in an x-y plane and supported by the substrate so as to be free to move in a z direction.

20. The flexible diaphragm of claim 19 wherein the diaphragm is supported by the substrate such that changes in air pressure result in movement of the diaphragm.

21. The flexible diaphragm of claim 19 wherein the diaphragm is supported by the substrate such that the diaphragm moves when actuated with an electrical signal.

22. A combination, comprising:

a substrate;

a plurality of micromachined membranes fabricated on the substrate;

a layer of material carried by each of said membranes so as to seal said membranes to form an array of flexible diaphragms; and a voltage source for biasing said diaphragm with respect to said substrate.

23. The combination of claim 22 wherein each of said micromachined membranes includes a serpentine shaped spring.

24. The combination of claim 23 wherein said serpentine shaped springs are each comprised of a plurality of alternately positioned long and short arms.

25. The combination of claim 24 wherein a longest side of each of said long arms is less than approximately 50 microns in length.

26. The combination of claim 24 wherein a maximum spacing between adjacent arms is approximately 3 microns.

27. The combination of claim 22 wherein each of said micromachined members includes a plurality of cells, each cell comprised of a plurality of serpentine shaped springs.

28. The combination of claim 22 wherein the substrate is selected from a group consisting of ceramic, glass, silicon, printed circuit board, and silicon-on-insulator semiconductor devices.

29. The combination of claim 22 wherein said layer of material is selected from a group consisting of polymer sealants.

* * * * *

UNITED STATES PATENT AND TRADEMARK OFFICE

CERTIFICATE OF CORRECTION

PATENT NO. : 6,829,131 B1
APPLICATION NO. : 09/395073
DATED : December 7, 2004
INVENTOR(S) : Loeb et al.

It is certified that error appears in the above-identified patent and that said Letters Patent is hereby corrected as shown below:

In the Title page:

Item (12), delete “Loeb et al.” and substitute therefore -- Neumann et al. --.
Item (75), Inventors, delete “Wayne A. Loeb, Pittsburgh, PA (US);”.

In the text, correct the following:

Column 3:
line 1, before “BREIF DESCRIPTION OF THE DRAWINGS” insert -- V. --.

Column 11:
lines 40 and 41, underline “Mathematical Behavior Modeling for a Sample MEMS Diaphragm Unit”.

Column 13:
line 43, delete “f” and insert therefore --*f*--.
line 47, delete “f” and insert therefore --*f*--.

Column 14:
line 32, delete “f” and insert therefore --*f*--.
line 45, delete “f” and insert therefore --*f*--.
line 46, delete “f” and insert therefore --*f*--.
line 49, delete “f” and insert therefore --*f*--.

Column 15, line 61, underline “Maple™ worksheet calculations”.

Column 18:
line 14, delete “(0.146922784)” and insert therefore -- (0.1469223784) --.
line 52, delete “. . .” and insert therefore -- . . --.
line 53, delete “. . .” and insert therefore -- . . --.
line 54, delete “. . .” and insert therefore -- . . --.

UNITED STATES PATENT AND TRADEMARK OFFICE

CERTIFICATE OF CORRECTION

PATENT NO. : 6,829,131 B1
APPLICATION NO. : 09/395073
DATED : December 7, 2004
INVENTOR(S) : Loeb et al.

It is certified that error appears in the above-identified patent and that said Letters Patent is hereby corrected as shown below:

Column 20, line 8 of claim 22, delete "diaphragm" and insert therefore -- diaphragms --.

Signed and Sealed this

Second Day of October, 2007

JON W. DUDAS
*Director of the United States Patent and Trademark Office*